United States Patent
Aoyama

(10) Patent No.: US 7,107,043 B2
(45) Date of Patent: Sep. 12, 2006

(54) CELLULAR TELEPHONE, AND METHOD AND APPARATUS FOR BACKUP OF DATA OF CELLULAR TELEPHONE

(76) Inventor: Shinji Aoyama, 301, Oshikiri 9-1, Ichikawa-shi, Chiba-ken (JP)

( * ) Notice: Subject to any disclaimer, the term of this patent is extended or adjusted under 35 U.S.C. 154(b) by 427 days.

(21) Appl. No.: 09/980,056

(22) PCT Filed: Mar. 29, 2001

(86) PCT No.: PCT/JP01/02685

§ 371 (c)(1),
(2), (4) Date: Nov. 29, 2001

(87) PCT Pub. No.: WO01/76302

PCT Pub. Date: Oct. 11, 2001

(65) Prior Publication Data

US 2002/0160760 A1  Oct. 31, 2002

(30) Foreign Application Priority Data

Mar. 31, 2000 (JP) ............................. 2000-100017

(51) Int. Cl.
*H04M 3/16* (2006.01)

(52) U.S. Cl. ............... 455/412.1; 455/428; 455/412.2; 455/419; 455/461; 455/457; 455/557; 340/426; 340/988; 340/457

(58) Field of Classification Search ............... 455/427, 455/428, 445, 412.1, 412.2, 419, 461, 422, 455/457, 557; 340/426, 988, 457
See application file for complete search history.

(56) References Cited

U.S. PATENT DOCUMENTS

| | | | | | |
|---|---|---|---|---|---|
| 5,920,826 A | * | 7/1999 | Metso et al. | ................. | 455/557 |
| 5,929,752 A | * | 7/1999 | Janky et al. | ............. | 340/426.2 |
| 5,933,778 A | * | 8/1999 | Buhrmann et al. | ......... | 455/461 |

FOREIGN PATENT DOCUMENTS

| | | |
|---|---|---|
| JP | 4-110034 | 9/1992 |
| JP | 5-055979 | 3/1993 |
| JP | 5-056131 | 3/1993 |
| JP | 5-145476 | 6/1993 |
| JP | 06-276147 | 9/1994 |
| JP | 08-182052 | 7/1996 |
| JP | 8-307944 | 11/1996 |
| JP | 09-252489 | 9/1997 |
| JP | 10-032631 | 2/1998 |
| JP | 3057080 | 12/1998 |
| JP | 11-055422 | 2/1999 |

* cited by examiner

*Primary Examiner*—Charles N Appiah
*Assistant Examiner*—Randy Peaches
(74) *Attorney, Agent, or Firm*—Pearne & Gordon LLP

(57) ABSTRACT

Upon establishing a wireless speech connection with a host station, a cellular telephone automatically sends data for backup that includes at least control information stored in the telephone. The data transmitted from the cellular telephone are saved in a data backup device of the host office.

22 Claims, 2 Drawing Sheets

CELLULAR TELEPHONE, AND METHOD AND APPARATUS FOR BACKUP OF DATA OF CELLULAR TELEPHONE

TECHNICAL FIELD

This invention relates to a data backup method for a portable telephone for backing up data such as telephone numbers and so on set and stored in the portable telephone, a portable telephone usable directly for carrying out this method and a data backup equipment for a portable telephone.

TECHNICAL FIELD

Since such portable telephones as cellular phones, personal handy phones (referred as to "PHS" later) and so on generally have a memory dial function for previously setting and storing the telephone numbers of partners in the telephones, many users can manage the telephone numbers of the partners using the memory dial function without memorizing the telephone numbers in another memory.

Thus, if the data such as the telephone numbers of the partners happen to be not able to be utilized because of a loss or a failure of the portable telephones or because of an elimination of the data due to external causes such as erroneous operation, shocks and so on, the users would suffer great disadvantages.

In addition to the case that the data cannot be utilized, in case that an old portable telephone is replaced by a new portable telephone, it will take much time for the user itself to input the same data as stored in the old telephone into the new telephone. Furthermore, if the data such as the telephone numbers stored in one telephone might be utilized in another telephone, a convenience of the telephones would increase.

In consideration of the aforementioned points, there have been proposed many arts in which the data such as the telephone numbers and so on stored in the portable telephones are stored into external storages. However, most of them disadvantageously require an equipment for externally storing the data separately for the portable telephone. These arts are disclosed in JP55-128955, JP58-58669, JP60-49463, JP61-20464, JP61-43050, JP64-22153, JP2-172355, JP4-302245, JP5-145476, JP9-64959, JP10-32631, JP11-74962, JU62-112241 and JU4-110034.

Furthermore, there have been proposed many other arts in which the data such as the telephone numbers are delivered and received between the portable telephone and a general information processing equipment called as a mobile gear or a personal computer without using any equipment peculiarly prepared for storing the telephone numbers. Similarly, these arts also disadvantageously require an equipment for externally storing the data separately for the portable telephone. These arts are disclosed in JP5-56131, JP5-292172, JP6-46120, JP6-90309, JP6-244986, JP7-111525 and JP8-6902, for example.

There has been proposed an art in which abbreviating dial information is stored in an external storage prepared in a telephone operation station or an exclusive operator without preparing it on the side of the user of the telephone so that other portable telephones can commonly use the abbreviating dial information. This art is disclosed in JP8-307944.

However, since any of the prior arts including the art in which the external storage is provided in the telephone operation station or the like requires the operation which the users themselves memorize such data as the telephone numbers and so on in the external storage, back up them or make an instruction therefor, the operation is much troublesome.

As the result, there occurs a problem in which the data such as the telephone numbers and so on cannot be possibly restored later when the data are erroneously eliminated or lost in case that the users fail to or don't or forget to back up the data. This is a big trouble in taking into consideration that the backup data are suddenly required in many cases.

There has been provided an art in which the data stored in volatile memories such as RAM, SRAM and so on which are operated in association with the power supply are memorized in the portable telephones together with the charging operation. This is disclosed in JP5-55979.

This also has occurred such a problem that if the data to be re-memorized in the portable telephones are previously neither stored nor backed up in the external storage, the data cannot be prevented from being lost because the data stored in the peculiarly prepared external storage is just re-memorized in the portable telephone together with the charging operation and because the data cannot be stored unless the RAM gets the state of being able to be operated by its energization and therefore the data are just re-memorized after the RAM gets the state of being able to be operated together with the charging operation or after being charged and in addition thereto, the external storage should be provided separately from the portable telephones in preparation for consumption of the battery and brought together with the portable telephones and if otherwise, the data cannot be restored, which causes the troublesome operation to be required.

Since any of the aforementioned prior arts have the object of only backing up the data such as the telephone numbers of the particular parties for operating the telephones to the parties, this cannot be coped with when the telephone break down in such a manner as the control information required for the operation of the portable telephones such as the programs peculiar to the telephones required to get the waiting-for state of arrival and dispatch of the telephones is lost by any cause.

In addition thereto, in any of the prior arts, since the setup functions in which the users themselves set personal identification numbers, adjust the arrival sound of the telephones and so on cannot be backed up, the information on these setup functions other than the telephone numbers has to be re-input by the users themselves when the old telephones are replaced by the telephones newly bought, for example, which produces a problem of making the operations troublesome.

The object of the invention is to provide a data backup method for a portable telephone and a method of backing up data by using the equipment adapted to prevent the data from being lost without any operation of intentionally backing up the date so that the data can be easily reused as they are and to more easily cope with the break-down of the telephones and the replacement of the telephones.

DISCLOSURE OF THE INVENTION

This invention fundamentally provides a method of backing up data stored in a portable telephone such as a cellular phone, a personal handy phone, a car telephone, a maritime mobile radiotelephone, a satellite cellular phone machine or the likes, said method comprising the steps of automatically transmitting data such as at least control information or setup function information required for operating the portable telephone, telephone call information of telephone numbers, arrival telephone numbers, dispatch telephone numbers, call time and so on set and stored in the portable telephone in association with a telephone call operation when a voice signal begins to be delivered and received for the telephone call between the portable telephone and a host office via radio signal and storing the data transmitted from the portable telephone in a data backup equipment provided in or connected to the host office whereby the data stored in the portable telephone are backed up.

In this manner, as the data such as the telephone numbers are automatically transmitted to the host office and stored in the data backup equipment in association with the telephone call operation which is in the state of ordinary use of the portable telephone, the telephone numbers and so on can be positively backed up without any intentional backup operation by the users. Thus, the backing up can be done without any troublesome operation and the important data can be positively prevented from being lost due to a failure to back up the data.

In this case, as the control information required for the operation of the portable telephone such as the program or the like peculiar to the portable telephone for requiring the telephone to wait for the arrival or the dispatch thereof in addition to the information such as the telephone numbers and so on input by the user as aforementioned are backed up, even if an obstacle to the control information happens by any cause and the portable telephone breaks down, the control information can be easily restored by the backed up data. Furthermore, since various setup function information such as a personal identification number and an arrival sound set by the user is backed up, even though these data are lost or even though an old telephone is replaced by a new telephone, the user itself is not required to re-input the setup function information in the new telephone because the backed up data can be used, which requires no troublesome operation of the user.

In the invention, what is meant by "control information required for the operation of the portable telephone" is the program peculiar to the telephone and required for getting the waiting-for state of the arrival or the dispatch of the telephone, which is required for the minimum function of the telephone and what is meant by "setup function information" is the setup information such as the selection of the personal identification number and the arrival sound, the adjustment of the arrival sound volume and the telephone call sound volume, the setup of the answering function, the dial key lock or the likes set by the user for setting the waiting-for state in predetermined circumstance.

As the arrival telephone numbers (arrival history) and the dispatch telephone numbers (dispatch history) among the telephone call information in addition to the control information, the setup function information and the telephone numbers are also backed up, even though the former data are eliminated because of the telephone call information amount exceeding the memory limit of the portable telephone, the user can have access to and use the eliminated data. Similarly, even though the information fails to be stored in the memory dial (telephone directory), the user can have access to and use the information later. Also, as the telephone call time is backed up, it can be used for referring to the use time and the use charge later.

As the data are backed up in the backup equipment provided in or connected to the host office for the telephone call, no peculiar equipment is required to be provided on the side of the user.

The portable telephone usually transmits an electric wave to base stations (a satellite for a satellite cellular phone) located at various places and does a telephone call to other telephones through a portable telephone exchange station connected to the base station. The portable telephone exchange station may be replaced by a control station connected to the base station and a portable telephone exchange station connected to the control station depending the kind of the portable telephone or by a general exchange station connected the portable telephone exchange station which is in turn connected to the control station if the portable telephone should do a telephone call to a general wire telephone. In this invention, what is meant by "host office" includes the base station which receives the electric wave from the portable telephone, the control office, and the portable telephone exchange station.

Since the base stations are located at various places and therefore not suitable for collectively keeping and managing the data, the data backup equipment may be desirably provided in the control station or the portable telephone exchange station in general. The data backup equipment may be provided at a separate place for the management of the information such as a management center connected to the host office, but not at the host office itself. As the data backup equipment is separately provided from the host office, the equipment is not connected to the control or the portable telephone exchange office, but to the base station whereby the data to be backed up can be transmitted from the base station directly to the data backup equipment such as the management center.

In the data backup method of the invention, the data such as a control information or a setup function information required at least for operating the portable telephone, a telephone call information of telephone numbers, arrival telephone numbers, dispatch telephone numbers, call time and so on or other arbitrary data set and stored in the portable telephone may be automatically transmitted to the host office at an arbitrary time set by a timer.

In this manner, as the data to be backed up are automatically transmitted to the host office at the arbitrary time set by the timer, the required data can be positively backed up even though the telephone call by telephone arrival or dispatch is not carried out by the user over a long period of time. Thus, the data can be fully prevented from being accidentally lost.

The data backup method of the invention further feeds back to the portable telephone the data stored in the data backup equipment provided in or connected to the host office whereby the data is re-memorized in the portable telephone.

As the data stored in the data backup equipment are adapted to be fed back to the portable telephone in this manner, the data such as the telephone numbers and so on in the portable telephone can be easily restored to the original condition even though they are accidentally lost. In case that the old portable telephone is replaced by the new portable telephone, the data such as the telephone numbers and so on set and used in the former portable telephone can be used without any operation of re-inputting and re-setting the data as well.

The data backup method of the invention may arbitrarily select and set the data to be transmitted to the host office or the data to be fed back to the portable telephone from the data backup equipment provided in or connected to the host office.

As the data to be backed up or fed back can be selected and set, the data that the user doesn't want to update can be set up arbitrarily and therefore the unintentional update of the data can be prevented and the unnecessary data communications can be omitted.

The data backup method of the invention may automatically processes or converts into other information the data transmitted from the portable telephone to the data backup equipment provided in or connected to the host office in case that the data have such predetermined conditions as the data are required to be processed whereby the processed data can be fed back to the portable telephone.

As the data read from the portable telephone is adapted to be automatically processed and stored in case that the data have such predetermined conditions as the data are required to be processed, the control signal such as the control program or the likes can be re-stored in the portable telephone after its upgrade so as to easily add the new functions thereto. Furthermore, the numbers of the cellular phones and the PHSs which are stored by 10 figures can be converted into the proper numbers of 11 figures and the data which are stored in Kana characters can be converted into the ones in Chinese characters corresponding thereto, for example. Thus, the existing portable telephones can be easily made to upgrade by affording the same function as the newest model to the existing telephones of the old model.

The invention further provides a portable telephone such as a cellular phone, a personal handy phone, a car telephone, a maritime mobile radiotelephone, a satellite cellular phone machine or the likes equipped with a telephone call section which delivers and receives a voice signal through a radio signal between the portable telephone and a host office so as to enable a telephone call with a called person, the portable telephone characterized by comprising a data transmitter section to automatically transmit data such as control information or setup function information required for operating the portable telephone, a telephone call information of telephone numbers, arrival telephone numbers, dispatch telephone numbers, call time and so on set and stored in the portable telephone in association with a telephone call operation when the voice signal begins to be delivered and received for the telephone call between the portable telephone and the host office via the radio signal.

This portable telephone can be used for the data backup method of the invention. This is used for accomplishing the aforementioned method by issuing an instruction for backing up the data from the portable telephone.

In the portable telephone of the invention, the data transmitter section may automatically transmits to the host office the data such as control information or setup function information required for operating the portable telephone, a telephone call information of telephone numbers, arrival telephone numbers, dispatch telephone numbers, call time and so on or other arbitrary data set and stored in the portable telephone at an arbitrary time set by a timer.

The portable telephone of the invention may further comprises a data feedback section to feed back to the portable telephone the data transmitted to the host office whereby the data is re-memorized in the portable telephone.

The portable telephone of the invention may further comprises a telephone side data selection section to arbitrarily select and set the data to be transmitted to the host office by the data transmitter section or the data to be fed back to the portable telephone from the host office by the data feedback section.

The invention further provides a data backup equipment (a first data backup equipment) for backing up data stored in a portable telephone such as a cellular phone, a personal handy phone, a car telephone, a maritime mobile radiotelephone, a satellite cellular phone machine or the likes, the data backup equipment characterized by comprising a notification section to automatically notify the portable telephone at an arbitrary time set by a timer that data such as control information or setup function information required at least for operating the portable telephone, a telephone call information of telephone numbers, arrival telephone numbers, dispatch telephone numbers, call time and so on set and stored in the portable telephone should be transmitted to a host office.

This first data backup equipment can be used for the data backup method of this invention. Although the aforementioned data backup method can be carried out by issuing the instruction for backing up the data on the side of the portable telephone so as to transmit the data (item 1), it may be carried out by issuing the instruction on the side of the date backup equipment provided in the host office so as to read the data (item 2) or on the sides of both of the portable telephone and the data backup equipment (item 3).

The first data backup equipment of the invention is used for accomplishing the aforementioned method by issuing the data backup instruction not on the side of the data backup equipment, but on the side of the portable telephone described in the aforementioned item 1. The notification section serves to call attention to the side of the telephone (the user) so that the data should be backed up through the telephone call. This enables the data to be positively backed up even though the user does not telephones over a long period.

The invention further provides a data backup equipment (a second data backup equipment) for backing up data stored in a portable telephone such as a cellular phone, a personal handy phone, a car telephone, a: maritime mobile radiotelephone, a satellite cellular phone machine or the likes, the data backup equipment characterized by comprising a data read section provided in or connected to a host office which delivers and receives a voice signal through a radio signal between the portable telephone-and the host office so as to enable a telephone call with a called person to automatically read data such as control information or setup function information required for operating the portable telephone, a telephone call information of telephone numbers, arrival telephone numbers, dispatch telephone numbers, call time and so on set and stored in the portable telephone in association with a telephone call operation when the voice signal begins to be delivered and received for the telephone call between the portable telephone and the host office via the radio signal whereby the data read by the data read section are stored.

The second data backup equipment is used for accomplishing the aforementioned method by reading the data stored in the portable telephone from the data backup equipment as described in the item 2 or 3.

In the second data backup equipment, the data read section may automatically read the data such as control information or setup function information required for operating the portable telephone, a telephone call information of telephone numbers, arrival telephone numbers, dispatch telephone numbers, call time and so on or other arbitrary data set and stored in the portable telephone at an arbitrary time set by a timer.

The first or second data backup equipment of the invention may comprise a feedback data transmitter section to feed back the stored data to the portable telephone whereby the data is re-memorized in the portable telephone.

The first or second data backup equipment of the invention may comprise a host office side data selection section to arbitrarily select and set the data to be read from the portable telephone by the data read section or the data to be fed back to the portable telephone by the feedback data transmitter section.

The first or second data backup equipment of the invention may comprise a data process section to automatically process or convert into other information the data received from the portable telephone in case that the data have such conditions as the date are required to be processed.

BEST MODE OF CARRYING OUT THE INVENTION

Figure 1:
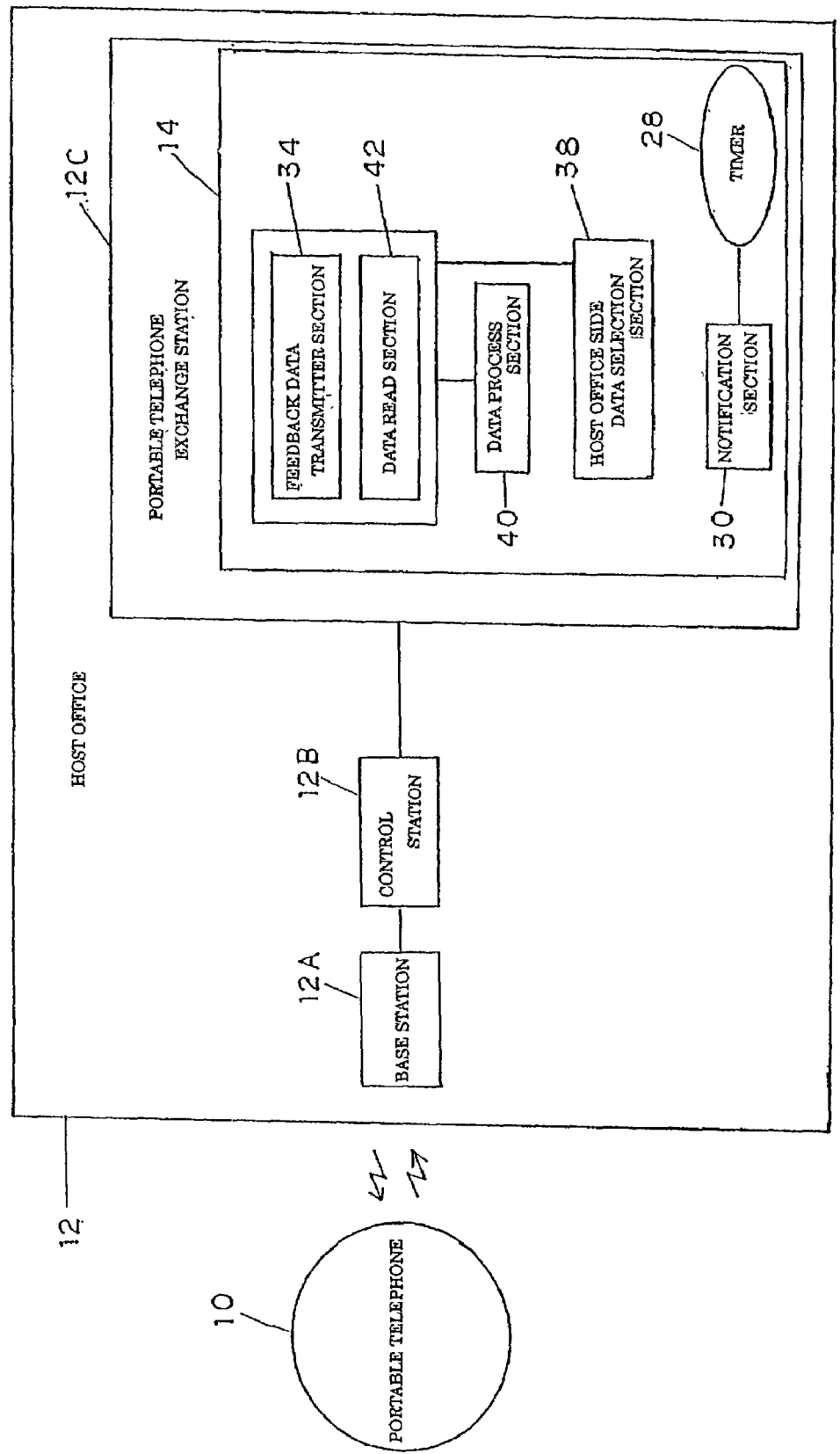
FIG. 1 is a schematic diagram of a condition in which the data backup method for a portable telephone according to the invention is carried out and a data backup equipment used for this method.

Describing a mode of carrying out the invention, FIG. 1 illustrates a condition in which a data backup method for a portable telephone 10 according to the invention is carried out. The portable telephone 10 may be any of a cellular phone, a personal handy phone system (PHS), a car telephone, a maritime mobile radiotelephone machine, a satellite cellular phone machine and so on. Of course, it is not limited to the aforementioned ones and may include mobile communication devices having other functions as long as they have the minimum function of telephone call.

In the invention, data set and stored in the portable telephone 10 are transmitted to a host office for telephone call as shown in FIG. 1 to back up the data. In the illustrated embodiment, the host office 12 comprises a base station 12A located at various places in a dotted manner to deliver and receive an electric wave between the host office 12 and the portable telephone 10, a control station 12B connected to the base station 12A and a portable telephone exchange station 12C connected to the control station 12B.

In the illustrated embodiment, the data to be transfemitted to and backed up in the host office 12 is stored in a data backup equipment 14 installed in the portable telephone exchange station 12C of the host office 12. Thus, no peculiar equipment on the side of the user of the portable telephone 10 is required for backing up the data.

In this case, the data to be backed up are automatically transmitted in association with the telephone call when the portable telephone 10 begins to deliver and receive a voice signal via a radio signal between the portable telephone 10 and the host office 12 for the telephone call and stored in the data backup equipment 14. Thus, since the telephone numbers and so on can be positively backed up without any operation for the intentional data backup by the user, trouble can be saved and also the important data can be prevented from being lost due to the failure to back up the data.

Figure 2:
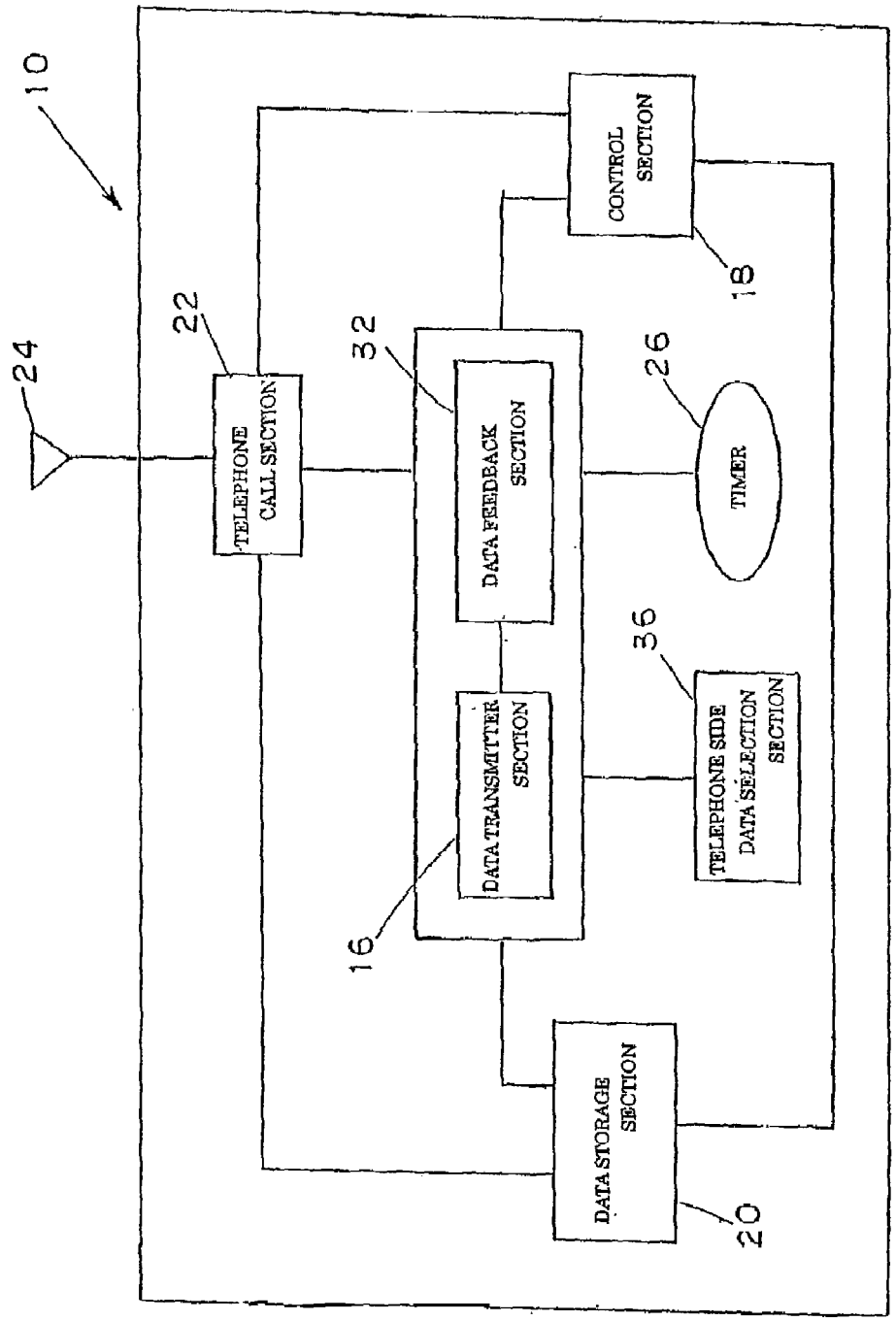
FIG. 2 is a schematic diagram of the portable telephone used for the invention.

More particularly, in the illustrated embodiment, backing up the data to the host office 12 is instructed on the side of the portable telephone 10. As shown in FIG. 2, the portable telephone 10 may have a data transmitter section 16 connected to a control section 18 and a data storage section 20 in which the data to be backed up are stored and also connected to a telephone call section 22 to deliver and receive the voice signal via the radio signal between the portable telephone 10 and the host office 12 to enable the telephone call with a person to be called. In FIG. 2 are illustrated only elements to be relevant to the invention among the elements of the portable telephone 10 and a reference numeral 24 designates an antenna.

The data transmitter section 16 reads the predetermined data from the control section 18 and the data storage section 20 by detecting the telephone call which begins by the delivery and reception of the voice signal by the telephone call section 22 and transmits the data through the telephone call section 22 and the antenna 24 to the host office 12.

In this case, although the signal through which the data to be backed up should be transmitted may be in the form of a packet signal, a TCP/IP radio signal and so on, it is not limited thereto and other appropriate signals may be used. The data signal is desirably transmitted separately from the voice signal for the telephone call, but in parallel thereto in consideration of a bad influence to the amount of data and the telephone call and may be transmitted simultaneously when the voice signal for the telephone call is transmitted, but they may be transmitted in addition to the voice signals for the telephone call depending on the kind of the signal.

The data to be transmitted to the host office 12 by the data transmitter section 16 include at least control information required for operating the portable telephone 10 among various data set and stored in the portable telephone. More particularly, such control information to be backed up may include a control program peculiar to the telephone and required for getting the waiting-for state of the arrival or the dispatch of the telephone, which is required for the minimum function of the telephone and stored in a non-volatility memory such as ROM, PROM and so on in the control section 18 of the portable telephone 10. With respect to the control program, it will be considered that a program such as a portable telephone operation system having a Java function in future may be installed in the portable telephone. This program may be included in the data to be backed up. In other words, the programs for controlling the portable telephone may be widely applicable to the backup in spite of the memorization method and the kind of memories to store the data. Thus, even if the telephone will be in a failure state because of the occurrence of a trouble in the control information due to any cause, the telephone can be easily restored to the original condition by feeding back the backed up data to the portable telephone 10 in a preferable manner.

In addition thereto, there may be backed up such setup function information as the selection of the personal identification number and the arrival sound, the adjustment of the arrival sound volume and telephone call sound volume, the setup of the answering function or the dial key lock, for example, stored in the memories in the control section 18 and the data storage section 20 and set by the user for setting the waiting-for state in predetermined circumstances. This saves trouble not only in case that the data are eliminated, but also in case that the old portable telephone is replaced by the new portable telephone because the backed up data can be used without any operation of the user's re-setting these setup function information data.

In addition to the control information and the setup function information, there may be backed up the telephone call information such as the telephone number, the abbreviated dialing, the dispatch telephone number information, the arrival telephone number information, telephone call time or the likes and other arbitrary data stored in the volatility memory such as RAM, SRAM and so on in the data storage section 20. Especially, in case that the telephone call information such as the arrival telephone number information (arrival history) and the dispatch telephone number information (dispatch history) are backed up, even though the old or former data happen to be eliminated because the amount of these telephone call information exceeds the limit of the memory, the user can have access to and use them later even though the user fails to write them in the dial directories. By backing up the telephone call time, it can be used for referring to the use time or use charge later. Others may be backed up so long as at least the aforementioned control information is included in the data to be backed up.

As shown in FIG. 1, the host office 12 that receives the data transmitted from the portable telephone 10 transmits the received data to the data backup equipment 14 where the data are stored. Any kind of medium in which the data should be stored may be used so long as the data to be backed up can be appropriately stored.

The data backup equipment 14 may judge an identification number information such as a subscriber number and so on transmitted from the portable telephone 10 together with the telephone call and store and manage the data corresponding to the identification number in a management area corresponding to the identification number for every identification number. Thus, the data for one of the subscribers are never erroneously confused with those for the other subscribers. The identification number is not limited to the subscriber number, but may be arbitrary one set in the portable telephone 10 for every user when it subscribes for the portable telephone or purchases it. This enables the backed up data to be used for the new portable telephone 10 when the old telephone is replaced by the new one or when the subscriber number changes.

Although, in the invention, the data backup starts fundamentally under the condition of telephone call, the data to be backed up may be automatically transmitted to the host office 12 at an arbitrary time set by a timer. This enables the necessary data to be positively backed up even though the user does not do the telephone call by the arrival or the dispatch of the portable telephone over a long period of time and therefore more positively prevents the data from being accidentally eliminated.

Since, in the illustrated embodiment, the command of the operation of backing up the data may be applied by the data transmitter section 16 detecting the dispatch or the arrival of the portable telephone 10, it may be applied by setting the portable telephone so as to start the transmission of the data under the conditions other than the telephone call. More particularly, as shown in FIG. 1, the data transmitter section 16 may include a timer 26 and the data to be backed up may be automatically transmitted to the host office 12 at an arbitrary time set by the timer 26.

Moreover, in place of or in addition to the timer 26 in the portable telephone 10, the data backup equipment may be provided with a notification section 30 to automatically notify the portable telephone 10 at an arbitrary time set by a timer 28 that the data to be backed up should be transmitted to the host office whereby the notification section 30 makes an attention to the user that the data should be backed up. This also enables the data to be positively backed up even though the user does not do the telephone call over a long period of time.

In the method of the invention, the data stored in the data backup equipment 14 provided in the host office 12 can be fed back to the portable telephone 10 and be re-memorized therein. This enables the portable telephone to be restored to the original condition even though the data such as the telephone numbers and others are accidentally eliminated. Especially, the failure of the portable telephone can be easily restored by feeding back the control information and the data such as the telephone numbers set and used in the former portable telephone 10 replaced by the new portable telephone can be used for the new portable telephone as they are without any operation of inputting and re-setting them.

More particularly, it can be accomplished by providing a data feedback section 32 in the portable telephone 10 as shown in FIG. 2, which serves to feed back to the portable telephone 10 the data transmitted to the host office and re-memorize therein. The data feedback section 32 may feed back the data by reading and receiving the data stored in the data backup equipment 14 in the host office 12 and updating or writing them in various memories, which is commanded by the user's applying the predetermined operation to the portable telephone 10 when the data in the portable telephone 10 are accidentally eliminated or when the data are required to be fed back for any reason. Since the control information is generally stored in a non-volatile memory and therefore it may be updated or written, it may be desirably memorized in the memory such as the non-volatile ROM of EEPROM or flash memory, the non-volatile RAM of NVRAM (RAM and EEPROM) and so on, in which the data can be electrically written or erased.

Since the portable telephone 10 cannot get the waiting-for-state in case that there happens an obstacle in the control information, the user cannot possibly perform the process for the telephone call or the aforementioned feedback back on the side of the portable telephone 10. Thus, as shown in FIG. 1, in addition to the provision of the data feedback section 32 in the portable telephone 10, in the data backup equipment 14 in the host office 12 may be also provided a feedback data transmitter section 34 to feed back the stored data to the portable telephone 10 and memorize them in the portable telephone 10 whereby a host office manager informed by the user applies a feedback command to the feedback data transmitter section 34 or the user itself applies the feedback command to the feedback data transmitter section 34 through other communication means such as another telephone while the identification number is input so as to compulsorily send the data and feed back them. This enables the failure to be restored to the original condition by feeding back the control information. Of course, the other setup function information, the telephone call information and so on can be fed back to the portable telephone 10 by applying the command from the feedback data transmitter section 34 of the data backup equipment 14.

In the invention, the data to be transmitted from the portable telephone 10 to the host office or the data to be fed back from the data backup equipment 14 in the host office 12 to the portable telephone 10 may be arbitrarily selected and set.

As aforementioned, the invention can back up the various data set and stored in the portable telephone 10, but the user will not want to back up any data among the various data or to feed back and re-memorize or write any data among the backed up data. To this end, in the condition that all the data can be transmitted, the data to be transmitted to the host office 12 can be arbitrarily set so as to be able to be selected whereby the data that the user doesn't want to back up or feed back are never transmitted to the host office 12 or in the condition that all the data are backed up by the data backup equipment 14, the individual data which the user don't want to be fed back can be arbitrarily selected among all the information backed up in the data backup equipment 14.

More particularly, as shown in FIG. 2, this can be accomplished by providing a telephone side data selection section to arbitrarily select and set the data to be transmitted from the portable telephone 10 to the host office 12 by the data transmitter section 16 or the data to be fed back from the host office 12 to the portable telephone 10 by the data feedback section 12. This enables the data which the user doesn't want to be renewed to be arbitrarily set, which can prevent the unintentional data from being updated and can omit the transmission of the unnecessary data.

As aforementioned, in case that the data are fed back from the feedback data transmitter section 34 of the data backup equipment 14 in the host office 12 in order to feed back the data such as the control information, there may be provided a host office side data selection section 38 to arbitrarily set and select the data to be fed back to the portable telephone 10 by the feedback data transmitter section 34 as shown in FIG. 1.

In invention, in the data backup equipment 14 provided in the host office 12 may be provided a data process section 40 as shown in FIG. 1. The data process section 40 serves to automatically process or convert the data received from the portable telephone 10 in case that the data have such predetermined conditions as the data are required to be processed.

Thus, in case that there is a revision of the control program or the like (the predetermined condition 1), the control signal for the control program and so on are upgraded and fed back to the portable telephone 10 by the data feedback section 32 of the portable telephone 10 or by the feedback data transmitter section 34 to re-memorize them whereby a new function can be easily added to the portable telephone 10.

Furthermore, since the numbers of the cellular phones and the PHSs which are stored by 10 figures (the predetermined condition 2) can be converted into the proper numbers of 11 figures and the data which are stored in Kana characters (the predetermined condition 3) can be converted into the ones in Chinese characters corresponding thereto, the existing portable telephones can be easily made to upgrade by affording the same function as the newest model to the existing telephones of the old model. The predetermined conditions can be manually, electrically or mechanically set and input in the data process section 40 in accordance with the nature thereof.

Although, in the illustrated embodiment, the initial command for the backup of the data is given by the data transmitter section 16 associating with the telephone call, it is not limited thereto and the command may be alternatively given from the data backup equipment 14 in the host office 12 where the data should be fed back.

In this case, in the data backup equipment 14, in addition to the feedback data transmitter section 34, the host office side data selection section 38 and the data process section 40, there may be provided a data read section 42 to automatically read the data in association with telephone call operation when the voice signal begins to be delivered and received for the telephone call between the portable telephone 10 and the host office 21 via the radio signal as shown in FIG. 2.

This data read section 42 may be so set as to automatically read the data to be backed up from the portable telephone 10 at an arbitrary time set by a timer 28, which enables the user to unconsciously back up the necessary data.

Preferably, the host office side data selection section 38 may arbitrarily select and set the data to be read from the portable telephone 10 by the data read section 42 in addition to the data fed back by the feedback data transmitter section 34.

The data backup equipment 14 may be desirably provided in the portable telephone exchange station 12C as shown in FIG. 1, but not in the base stations 12A located at various places in order to collectively store and manage the data to be backed up. The place where the data backup equipment 14 is located is not limited to the portable telephone exchange station 12C, but may be the control station 12B or the base station 12A. Also, it is not located at the host office itself, but may be located at a separate place such as a management center, for example and connected to the host office whereby the data are stored. In this case the data backup equipment 14 may be connected to either of the base station 12A, the control station 12B and the portable telephone exchange station 12C or any ones of them.

In accordance with the invention, as aforementioned, since the data such as the telephone numbers are automatically transmitted to the host office and stored in the backup equipment in association with the telephone call which is in the state of ordinary use of the portable telephone, the telephone numbers and so on can be positively backed up without any intentional backup operation by the users. Thus, the backing up can be done without any troublesome operation and the important data can be positively prevented from being lost due to a failure to back up the data.

In this case, as the control information required for the operation of the portable telephone such as the program or the like peculiar to the portable telephone for making the telephone the wait-for-state of the arrival or the dispatch thereof in order to have the minimum function of the telephone in addition to the information such as the telephone numbers input by the user as aforementioned are backed up, even if an obstacle to the control information happens by any cause and the portable telephone breaks down, the control information can be easily restored by the backed up data.

Furthermore, since various setup function information such as the selection of a personal identification number for making various setups and an arrival sound, the adjustment of the arrival sound volume or telephone call volume, the setup of the answering machine and the dial key lock set by the user is backed up, even though these data are eliminated or even though the old telephone is replaced by the new telephone, the user itself is not required to re-input the setup function information because the backed up data can be used, which requires no troublesome operation of the user.

Since the arrival telephone number information (arrival history) and the dispatch telephone number information (dispatch history) among the telephone call information in addition to the telephone numbers are also backed up, even though the former data are eliminated because of the telephone call information amount exceeding the memory limit of the portable telephone, the user can have access to and use the eliminated data. Similarly, even though the information fails to be stored in the memory dial (telephone directory), the user can have access to and use the information later. Also, since the telephone call time is backed up, it can be used for referring to the use time and the use charge later.

Since the data are backed up in the backup equipment provided in or connected to the host office for the telephone call, no peculiar equipment is required to be provided on the side of the user.

Since the data to be backed up are automatically transmitted to the host office at the arbitrary time set by the timer, the required data can be positively backed yup even though the telephone call by the telephone arrival or dispatch is not carried out by the user over a long period of time. Thus, the data can be fully prevented from being accidentally lost.

Since the invention can feed back the data stored in the data backup equipment to the portable telephone, the data such as the telephone numbers and others can be restored to the original condition even though they are accidentally eliminated. In case that the old portable telephone is replaced by the new portable telephone, the data such as the telephone numbers and so on set and used in the former portable telephone can be used for the new portable telephone without any operation of re-inputting and re-setting the data as well.

Since the data to be backed up or fed back can be selected and set, the data that the user doesn't want to update can be set up arbitrarily and therefore the unintentional update of the data can be prevented and the unnecessary data communications can be omitted.

Since the data read from the portable telephone is adapted to be automatically processed or converted and stored in case that the data have such predetermined conditions as the data are required to be processed, the control signal such as the control program or the likes are re-memorized in the portable telephone after its upgrade so as to easily add the new functions thereto. Furthermore, since the numbers of the cellular phones and the PHSs which are stored by 10 figures can be converted into the proper numbers of 11 figures and the data which are stored in Kana characters can be converted into the ones in Chinese characters corresponding thereto, the existing portable telephones can be easily made to upgrade by affording the same function as the newest model to the existing telephones of the old model.

Since the invention can automatically notify the portable telephone at the arbitrary time set by the timer that the data to be backed up should be transmitted to the host office, the data can be positively backed up even though the user don't do the telephone call over a long period of time.

UTILIZABILITY FOR INDUSTRIES

As aforementioned, the method of the invention can unconsciously store the data set and memorized in the portable telephone without any peculiar operation and therefore suitable for storage service of the data of the portable telephone.

The invention claimed is:

1. A method for backing up data set and stored in a portable telephone that cooperates with a host office for telephone communication, said data being selected from the group including a program peculiar to said telephone for waiting for placing or receiving calls, a personal identification number, a ringer sound, a ringer volume, a telephone call sound volume, a telephone call answering function setup, a dial key lock setup, and telephone numbers, comprising the steps of automatically transmitting said data in association with a telephone call operation between said portable telephone and said host office, said data being automatically transmitted by said portable telephone to said host office when a voice signal of a telephone call begins to be delivered and received for the telephone call between said portable telephone and said host office via a radio signal, and storing said data transmitted from said portable telephone in a data backup equipment provided in or connected to said host office where by said data stored in said portable telephone are backed up.

2. A data backup method for a portable telephone as set forth in claim 1, characterized by automatically transmitting to said host office said data set and stored in said portable telephone at an arbitrary time set by a timer.

3. A data backup method for a portable telephone as set forth in claim 1 or 2, further comprising the step of feeding back to said portable telephone said data stored in said data backup equipment provided in or connected to said host office whereby said data is re-memorized in said portable telephone.

4. A data backup method for a portable telephone as set forth in claim 3, further comprising the step of arbitrarily selecting and setting said data to be transmitted to said host office or said data to be fed back to said portable telephone from said data backup equipment provided in or connected to said host office.

5. A data backup method for a portable telephone as set forth in claim 3, further comprising the step of automatically processing or converting into other information said data transmitted from said portable telephone to said data backup equipment provided in or connected to said host office in case that said data have such predetermined conditions as said data are required to be processed whereby said processed or converted data are fed back.

6. A portable telephone equipped with a telephone call section which delivers and receives a voice signal through a radio signal between said portable telephone and a host office so as to enable a telephone call with a called person, said portable telephone comprising a data transmitter section to automatically transmit data set and stored in said portable telephone in association with a telephone call operation between said portable telephone and said host station, said data being automatically transmitted by said portable telephone to said host office when a voice signal begins to be delivered and received for said telephone call between said portable telephone and said host office via said radio signal, said data being selected from the group including a program peculiar to said telephone for waiting for placing or receiving calls, a personal identification number, a ringer sound, a ringer volume, a telephone call sound volume, a telephone call answering function setup, a dial key lock setup, and telephone numbers.

7. A portable telephone as set forth in claim 6, wherein said data transmitter section automatically transmits to said host office said data set and stored in said portable telephone at an arbitrary time set by a timer.

8. A portable telephone as set forth in claim 6 or 7, further comprising a data feedback section to feed back to said portable telephone said data stored in said data backup equipment provided in or connected to said host office whereby said data is re-memorized in said portable telephone.

9. A portable telephone as set forth in claim 8, further comprising a telephone side data selection section to arbitrarily select and set said data to be transmitted to said host office by said data transmitter section or said data to be fed back to said portable telephone from said host office by said data feedback section.

10. A portable telephone as set forth in claim 6, further comprising data backup equipment for backing up data stored in said portable telephone, said data backup equipment comprising a notification section to automatically notify said portable telephone at an arbitrary time set by a timer that said data set and stored in said portable telephone should be transmitted to said host office.

11. Data backup equipment for backing up data stored in a portable telephone, said data backup equipment comprising a data read section provided in or connected to a host office which delivers and receives a voice signal through a radio signal between said portable telephone and said host office so as to enable a telephone, call with a called person to automatically read said data set and stored in said portable telephone in association with a telephone call operation between said portable telephone and said host station, said data being automatically transmitted by said portable telephone to host office when said voice signal begins to be delivered and received for said telephone call between said portable telephone and said host office via said radio signal whereby said data read by said data read section are stored, said data being selected from the group including a program peculiar to said telephone for waiting for placing or receiving calls, a personal identification number, a ringer sound, a ringer volume, a telephone call sound volume, a telephone call answering function setup, a dial key lock setup, and telephone numbers.

12. Data backup equipment for a portable telephone as set forth in claim 11, wherein said data further comprises, arrival telephone numbers, dispatch telephone numbers, call time or other arbitrary data set and stored in said portable telephone at an arbitrary time set by a timer.

13. Data backup equipment for a portable telephone as set forth in either of claims 10 through 12, further comprising a feedback data transmitter section to feed back said stored data to said portable telephone whereby said data is re-memorized in said portable telephone.

14. Data backup equipment for a portable telephone as set forth in claim 13, further comprising a host office side data selection section to arbitrarily select and set said data to be read from said portable telephone by said data read section or said data to be fed back to said portable telephone by said feedback data transmitter section.

15. Data backup equipment for a portable telephone as set forth in either of claims 11 or 12, further comprising a data process section to automatically process or convert into other information said data received from said portable telephone in case that said data have such predetermined conditions as said data are required to be processed.

16. A data backup method for a portable telephone as set forth in claims 1 or 2, further comprising the step of automatically processing or converting into other information said data transmitted, from said portable telephone to said data backup equipment provided in or connected to said host office in case that said data have such predetermined conditions as said data are required to be processed whereby said processed or converted data are fed back.

17. A data backup method for a portable telephone as set forth in claim 4, further comprising the step of automatically processing or converting into other information said data transmitted from said portable telephone to said data backup equipment provided in or connected to said host office in case that said data have such predetermined conditions as said data are required to be processed whereby said processed or converted data are fed back.

18. Data backup equipment for a portable telephone as set forth in claim 13, further comprising a data process section to automatically process or convert into other information said data received from said portable telephone in case that said data have such predetermined conditions as said data are required to be processed.

19. Data backup equipment for a portable telephone as set forth in claim 14, further comprising a data process section to automatically process or convert into other information said data received from said portable telephone in case that said data have such predetermined conditions as said data are required to be processed.

20. A data backup method for a portable telephone as set forth in claim 1, wherein said portable phone is selected from the group consisting of a cellular phone, a personal handy phone, a car telephone, a maritime mobile radiotelephone and a satellite cellular phone machine.

21. A data backup method for a portable telephone as set forth in claim 1, wherein said data further comprises call times.

22. A data backup method for a portable telephone as set forth in claim 1, wherein said host office includes a base station which receives said radio signal from said portable telephone, a control office and a portable telephone exchange station.

* * * * *